(12) United States Patent
Kang et al.

(10) Patent No.: US 8,950,870 B2
(45) Date of Patent: *Feb. 10, 2015

(54) PROJECTION DISPLAY DEVICE FOR PROJECTING AN INPUT UNIT IMAGE

(71) Applicant: LG Electronics Inc., Seoul (KR)

(72) Inventors: Ho Joong Kang, Seoul (KR); Seung Gyu Lee, Seoul (KR); Sang Sik Jeong, Seoul (KR); Oh Jin Kweon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,445

(22) Filed: Nov. 19, 2013

(65) Prior Publication Data

US 2014/0146292 A1 May 29, 2014

Related U.S. Application Data

(63) Continuation of application No. 12/745,128, filed as application No. PCT/KR2009/000690 on Feb. 13, 2009, now Pat. No. 8,633,892.

(30) Foreign Application Priority Data

Sep. 3, 2008 (KR) .................. 10-2008-0086736

(51) Int. Cl.
  *G03B 21/26* (2006.01)
  *G03B 21/14* (2006.01)
  *G02B 27/10* (2006.01)
  *G02B 27/14* (2006.01)
  *G03B 21/134* (2006.01)

(52) U.S. Cl.
  CPC ............ *G03B 21/142* (2013.01); *G02B 27/104* (2013.01); *G02B 27/145* (2013.01); *G03B 21/134* (2013.01)
  USPC ............................................ 353/28; 345/168

(58) Field of Classification Search
  USPC ............................... 353/28, 31; 345/168–178
  See application file for complete search history.

(56) References Cited

U.S. PATENT DOCUMENTS

| 5,135,300 A | 8/1992 | Toide et al. |
| 6,650,318 B1 | 11/2003 | Arnon |
| 7,173,605 B2 | 2/2007 | Fong et al. |
| 7,380,947 B2 | 6/2008 | Duboc et al. |

(Continued)

FOREIGN PATENT DOCUMENTS

| EP | 1 814 003 A1 | 8/2007 |
| KR | 10-2003-0072591 A | 9/2003 |

(Continued)

*Primary Examiner* — Thanh Luu
*Assistant Examiner* — Renee D Chavez
(74) *Attorney, Agent, or Firm* — Birch, Stewart, Kolasch & Birch, LLP

(57) ABSTRACT

A projection display device (100) capable of providing a virtual keyboard function to the user, using a light source of a pico projector, is discussed. According to an embodiment, the projection display device includes a light source unit (110) configured to emit lights; a light combining unit (120) configured to generate a leakage light from the lights emitted by the light source (110) unit and to selectively combine the lights from the light source unit (110); an image projection unit (130) configured to project an image using the combined light from the light combining unit (120); and a virtual input unit (140) configured to project an input unit image (150) using the leakage light from the light combining unit (120).

16 Claims, 9 Drawing Sheets

(56) References Cited

U.S. PATENT DOCUMENTS

| | | |
|---|---|---|
| 7,828,444 B2 | 11/2010 | Lai et al. |
| 8,123,361 B2 | 2/2012 | Nagashima et al. |
| 8,633,892 B2 * | 1/2014 | Kang et al. .................... 345/158 |
| 2007/0222760 A1 | 9/2007 | Lieberman et al. |
| 2008/0174740 A1 | 7/2008 | Chou et al. |

FOREIGN PATENT DOCUMENTS

| | | |
|---|---|---|
| KR | 10-2006-0111472 A | 10/2006 |
| WO | WO 02/054169 A2 | 7/2002 |

\* cited by examiner

PROJECTION DISPLAY DEVICE FOR PROJECTING AN INPUT UNIT IMAGE

CROSS-REFERENCE TO RELATED APPLICATIONS

This application is a Continuation of co-pending application Ser. No. 12/745,128 filed on May 27, 2010, which is a National Stage of PCT/KR2009/000690 filed on Feb. 13, 2009, which claims priority to Korean Application No. 10-2008-0086736 filed on Sep. 3, 2008. The contents of all of the above applications are hereby incorporated by reference in their entireties.

TECHNICAL FIELD

The present invention relates to a projection display device for projecting an image onto an external screen, to display the projected image on the external screen.

BACKGROUND ART

Large-screen, high-picture-quality display devices have received much attention recently. Various large-screen display devices have been developed and commercially available.

A projection display device, namely, a projector, is an example of such a large-screen display device. Generally, the projector projects an image produced in a display element onto a screen using the light emitted from a light source, and thereby displays the image. Recently, a projector having an ultra-mini size has been developed.

Such a projector is referred to as a "pico-projector". This projector can be internally or externally equipped in a portable terminal such as a mobile phone, a notebook computer, or a portable multimedia player (PMP), or in a desktop computer.

The projector can include a virtual keyboard for projecting a virtual keyboard image onto a surface or floor, and for sensing a motion of the user s finger on the projected keyboard image, thereby recognizing a key input.

DISCLOSURE OF INVENTION

Technical Problem

However, a projector, which has a minimal number of optical elements and which can effectively project a virtual keyboard and images, is needed.

Technical Solution

An object of the present invention is to provide a projection display device capable of providing a virtual keyboard function to a user, using a light source of a pico projector.

Another object of the present invention is to provide a projection display device and method, which address the limitations and disadvantages associated with the related art projection display devices and methods.

Another object of the present invention is to provide a projection display device and method, which utilize a leakage light to project a virtual keyboard or a virtual input device.

Another object of the present invention is to provide a projection display device having a reduced size.

According to an embodiment, the present invention provides a projection display device comprising: first to third light sources for emitting first to third light, respectively; an image projection unit for producing an image, using the light emitted from the light sources, and projecting the produced image onto a screen; a color synthesizing unit for selectively transmitting or reflecting the light, not only to emit the light toward the image projection unit, but also to leak a portion of the light; and a virtual keyboard for projecting a keyboard image having at least one key image, using light leaked from the color synthesizing unit, to display the keyboard image.

The projection display device may further comprise a first reflection mirror for reflecting the light leaked from the color synthesizing unit, to send the reflected light to the virtual keyboard. The virtual keyboard may produce the keyboard image, using the light sent from the first reflection minor, and may project in a direction reverse to a projection direction of the image projection unit. The virtual keyboard may be arranged in parallel to the image projection unit.

The projection display device may further comprise a second reflection mirror for reflecting the image from the image projection unit such that the image from the image projection unit is projected in a direction reverse to a projection direction of the virtual keyboard.

The projection display device may further comprise a third reflection mirror for reflecting the keyboard image projected from the virtual keyboard such that the keyboard image is projected in a direction parallel to a projection direction of the image projection unit.

The projection display device may further comprise a rotating unit for rotating the virtual keyboard such that the keyboard image from the virtual keyboard is projected in parallel to a projection direction of the image projection unit.

The color synthesizing unit may comprise: a first dichroic mirror arranged at a position where the first light from the first light source and the second light from the second light source cross each other, not only to transmit the first light while reflecting the second light, but also to reflect a portion of the first light or to transmit a portion of the second light such that the first or second light portion is sent toward the virtual keyboard; and a second dichroic mirror arranged at a position where the first light from the first light source and the third light from the third light source cross each other, to transmit the first light and the second light while reflecting the third light. In this case, the virtual keyboard may be arranged on an optical path of light leaked by the first dichroic mirror. The projection display device may further comprise fourth light source arranged at a position near the first light source, to emit light having the same color as the second light. The projection display device may further comprise a fifth light source arranged at a position near the second light source, to emit light having the same color as the first light.

The color synthesizing unit may comprise: a first dichroic mirror arranged at a position where the first light from the first light source and the second light from the second light source cross each other, to transmit the first light while reflecting the second light; and a second dichroic mirror arranged at a position where the first light from the first light source and the third light from the third light source cross each other, not only to transmit the first and second light while reflecting the third light, thereby sending the first to third light toward the image projection unit, but also to reflect a portion of the first and second light or to transmit a portion of the third light such that the first and second light portion or the third light portion is sent toward the virtual keyboard. In this case, the virtual keyboard may be arranged on an optical path of light leaked by the second dichroic mirror. The projection display device may further comprise a sixth light source arranged at a position near the third light source, to emit light having the same color as the first light or a seventh light source arranged at a position near the third light source, to emit light having the same color as the second light.

The projection display device may further comprise a light shutter arranged between the color synthesizing unit and the virtual keyboard, to shut or transmit the light leaked from the color synthesizing unit. The light shutter may have a dynamic aperture (DA) drive structure. The light shutter may transmit the light leaked from the color synthesizing unit when the virtual keyboard operates, and may shut the light leaked from the color synthesizing unit when the virtual keyboard does not operate.

The projection display device may further comprise a condensing lens arranged between the color synthesizing unit and the virtual keyboard, to condense the light leaked from the color synthesizing unit.

The virtual keyboard may comprise: a mask having a patterned keyboard shape including at least one key shape, to produce the keyboard image, using the light leaked from the color synthesizing unit; a projection lens for projecting the keyboard image produced by the mask; and a camera for photographing an angle and motion of an object on the projected keyboard image.

Alternatively, the virtual keyboard may comprise: a diffraction grating device recorded with phase data corresponding to a keyboard shape having at least one key shape, to project the keyboard image, using light leaked from the color synthesizing unit; a lens for adjusting a projection distance of the keyboard image; and a camera for photographing an angle and motion of a user's finger on the projected keyboard image.

According to another aspect, the present invention provides a projection display device comprising: a light source unit configured to emit lights; a light combining unit configured to generate a leakage light from the lights emitted by the light source unit and to selectively combine the lights from the light source unit; an image projection unit configured to project an image using the combined light from the light combining unit; and a virtual input unit configured to project an input unit image using the leakage light from the light combining unit.

According to another aspect, the present invention provides a projection display device comprising: first to third light sources configured to emit first to third lights, respectively; an image projection unit configured to produce an image using the lights emitted from the light sources, and to project the produced image onto a screen; a color synthesizing unit configured to selectively transmit or reflect each of the first to third lights, and to generate a leakage light from at least one of the first to third lights; and a virtual input unit configured to project an input unit image using the leakage light leaked from the color synthesizing unit.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Advantageous Effects

Functional effects of a projection display device according to the present invention is to provide a projection display device capable of providing a virtual keyboard function to a user, using a light source of a pico projector.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

MODE FOR THE INVENTION

Reference will now be made in detail to the preferred embodiments of the present invention associated with a projection display device, examples of which are illustrated in the accompanying drawings. However, the scope of the present invention is not limited to the following embodiments and drawings. Further, one or more features of one embodiment can be applied to any other embodiment of the invention. Although a suffix "module or "unit" is used for constituent elements described in the following description, it is intended only for easy description of the specification. The suffix itself has no meaning or function to distinguish the constituent element using the suffix from the constituent element using no suffix.

It can be appreciated by a skilled person that the projection display device according to the present invention may be implemented in the form of a pico-projector, and may be internally or externally equipped in a portable terminal such as a mobile phone, a smart phone, a notebook (laptop) computer, a digital broadcast terminal, a personal digital assistant (PDA), an MP3 player, a portable multimedia player (PMP), or a navigation terminal, or in a fixed terminal such as a digital TV or a desktop computer.

Hereinafter, the constituent elements of the projection display device according to an embodiment of the present invention will be described with reference to FIG. 1.

Figure 1:
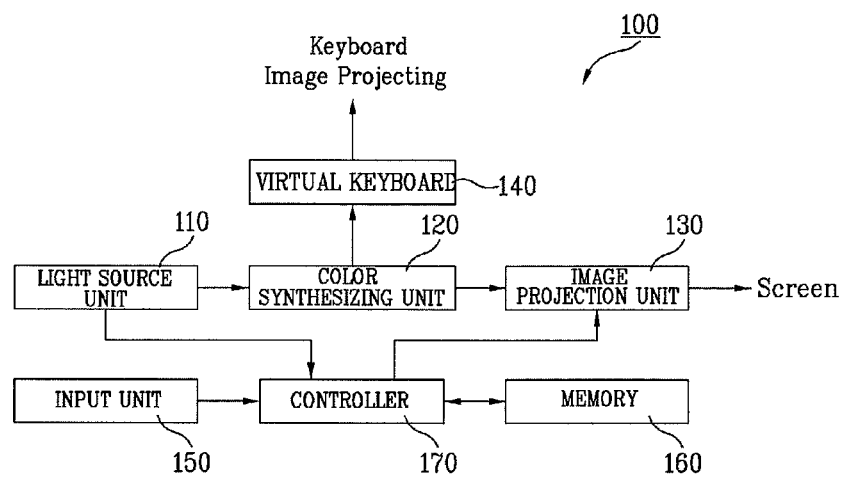
FIG. 1 is a functional block diagram schematically illustrating an example of a projection display device according to an embodiment of the present invention.

FIG. 1 is a functional block diagram schematically illustrating an example of the projection display device according to the present invention.

First, the overall configuration of a projection display device 100 according to an embodiment of the present invention will be described with reference to FIG. 1.

The projection display device 100 according to the present invention includes a light source unit 110, a color synthesizing unit 120, an image projection unit 130, a virtual keyboard 140, an input unit 150, a memory or storage unit 160, and a controller 170. The color synthesizing unit 120 may be referred to herein as a light combining unit or a light synthesizing unit.

Of course, the projection display device 100 according to the present invention may further include other elements, if necessary, in addition to the above-described constituent elements. However, no detailed description will be given of these additional elements, for simplicity of description, because the additional elements have no direct relation with the present invention. All the elements of the projection display device 100 are operatively coupled and configured.

Meanwhile, it should be noted that each of the above-described constituent elements may be combined with another constituent element to form one constituent element, or may be divided into two or more constituent elements.

Now, the constituent elements of the projection display device 100 according to the present invention will be described one by one.

The light source unit 110 includes first to third light emitting diodes (LEDs) 111, 112, and 113 for emitting red (R) light, green (G) light, and blue (B) light, respectively. The LEDs 111, 112, and 113 generate and emit the R light, G light, and B light, respectively, in accordance with the drive current supplied from a power supply under the control of the controller 170.

The light source unit 110 may include laser diodes, in place of the LEDs, or can include other types of light generating components.

The color synthesizing unit 120 performs a selective light transmission/reflection for the light emitted from the light source unit 110, and then sends the resultant light toward the image projection unit 130 while causing the light to be partially leaked to the virtual keyboard 140.

Hereinafter, various examples of the configurations of the light source unit 110 and color synthesizing unit 120 of the projection display device according to the present invention will be described in detail in conjunction with various embodiments thereof, with reference to FIGS. 2 to 7. The light source unit and the color synthesizing unit of FIGS. 2-7 here correspond to the light source unit 110 and the color synthesizing unit 120 of the projection display device 100, but may correspond to other units of a display device. Further, the light source unit and the color synthesizing unit of FIGS. 2-7 may correspond to a light source unit and a color synthesizing unit of a projection display device of other figures of the present invention.

Figure 2:
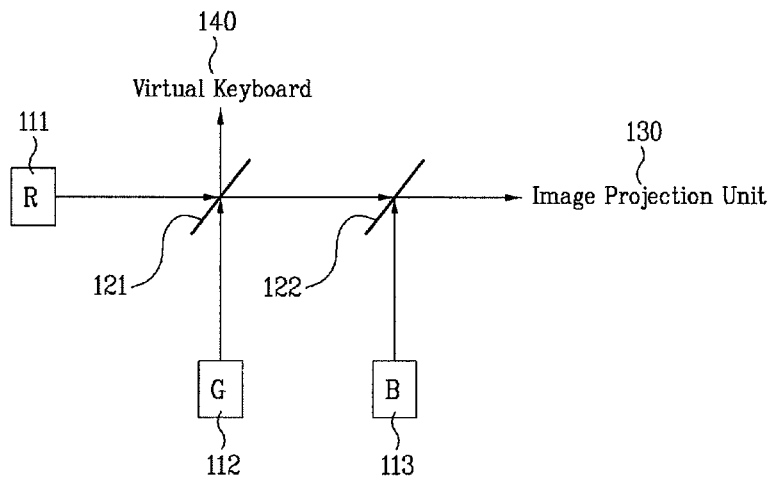
FIG. 2 is a schematic view illustrating an example of the configurations of a light source unit and a color synthesizing unit of a projection display device according to a first embodiment of the present invention.

FIG. 2 is a schematic view illustrating the configurations of a light source unit and a color synthesizing unit of a projection display device according to a first embodiment of the present invention.

Referring to FIG. 2, as an example, the color synthesizing unit 120 according to the first embodiment of the present invention may include first and second dichroic mirrors 121 and 122.

Each of the first and second dichroic mirrors 121 and 122 is a mirror for selectively reflecting and/or transmitting only the light of a particular wavelength or wavelengths, to obtain the light of a desired wavelength band. Each of the first and second dichroic mirrors 121 and 122 transmits and/or reflects a selected one of the light beams emitted from the LEDs 111, 112, and 113.

For instance, the first dichroic mirror 121 may be arranged at a position where the R light and G light cross each other. The first dichroic mirror 121 transmits the R light while reflecting the G light. The second dichroic mirror 122 transmits the R light and G light emerging from the first dichroic mirror 121 while reflecting the B light from the LED 113, so that it emits the R, G, and B light towards the image projection unit 130. And the image projection unit 130 projects an image using the combined R, G and B light.

Thus, the R light, G light, and B light are synthesized while passing through the two dichroic mirrors 121 and 122 so that they produce light of various colors in accordance with an image to be produced.

Although the above description has been given under the assumption that the first dichroic mirror 121 is arranged at the position where the R light and G light cross each other, the positions of the dichroic minors 121 and 122 according to the present invention are not limited thereto, and may vary as needed.

As shown in FIG. 2, the first dichroic mirror 121 according to the first embodiment of the present invention not only sends the R light and G light to the image projection unit 130 by transmitting the R light while reflecting the G light, but also sends a portion of the R light and a portion of the G light to the virtual keyboard 140 by reflecting the R light portion while transmitting the G light portion. That is, the first dichroic mirror 121 is configured to intentionally direct or leak some of the R and G light towards the virtual keyboard 140. The virtual keyboard 140 then uses the leaked light to project a virtual keyboard image or any other suitable input unit image onto a floor or surface. The virtual keyboard 140 may include optical elements used to project a virtual keyboard image or any other suitable input unit image such as a virtual mouse image, a virtual keypad image, etc.

Figure 3:
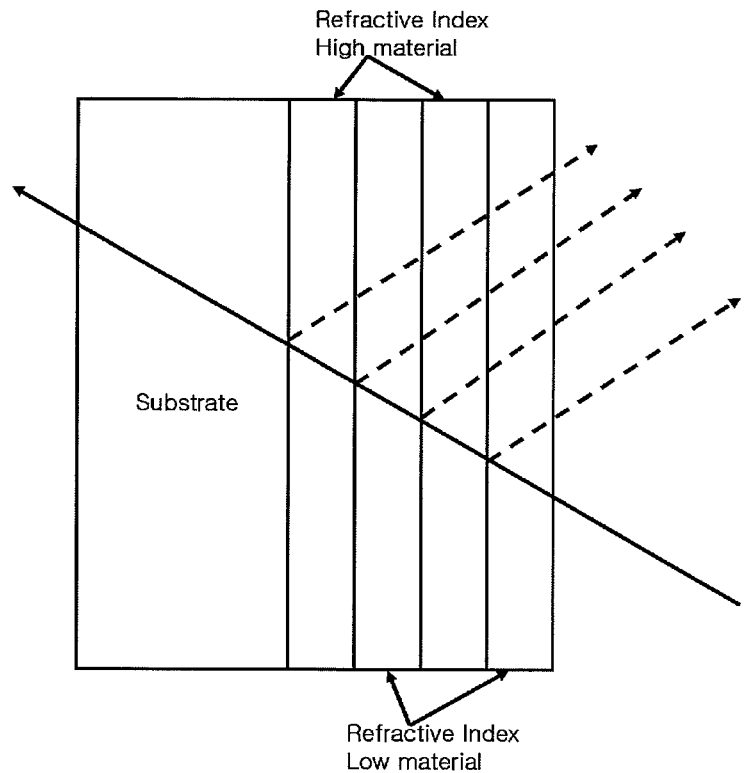
FIG. 3 is a schematic view illustrating an example of the configurations of a dichroic mirror according to an embodiment of the present invention.

FIG. 3 is a schematic view illustrating an example of the configurations of a dichroic mirror according to an embodiment of the present invention. Referring to FIG. 3, preferably, the dichroic minors 121 and 122 may be formed by alternately laminating or coating first and second materials having different refractive indexes as shown.

In this case, the amounts of light leaked from the dichroic mirrors 121 and 122 may be varied in accordance with the refractive indexes, thicknesses, and/or lamination numbers of the first and second materials. Accordingly, it is possible to adjust the amounts of light intentionally leaked from the dichroic minors 121 and 122 by adjusting the refractive indexes, thicknesses, and/or lamination numbers of the first and second materials.

In this case, the virtual keyboard 140 is arranged on a light leakage path of the first dichroic mirror 121. That is, the first dichroic mirror 121 not only performs an original function of transmitting the R light therethrough while reflecting the G light, but also performs a function of reflecting a portion of the R light and/or transmitting a portion of the G light such that the R light portion and/or G light portion is directed to the virtual keyboard 140. This enables the R light source 111 and/or G light source 112 to be used as a light source for projection of a virtual keyboard image in the virtual keyboard 140 while the same light sources are used to project images by the image projection unit 130 in accordance with the first embodiment of the present invention.

When an excessive amount of light is leaked from the first dichroic mirror 121 to the virtual keyboard 140, the picture quality of the image projected from the image projection unit 130 may be degraded. Therefore, it is preferred that the first dichroic mirror 121 be fabricated such that the leaked portion of the R light or G light is within a range of 1 to 20%.

However, even when the first dichroic mirror 121 reflects a portion of the R light and/or transmits a portion of the G light within a range of 1 to 20%, it may be desirable to have more light or the amount of light supplied from the first dichroic mirror 121 may be insufficient, to enable the virtual keyboard 140 to project a virtual keyboard image.

Figure 4:
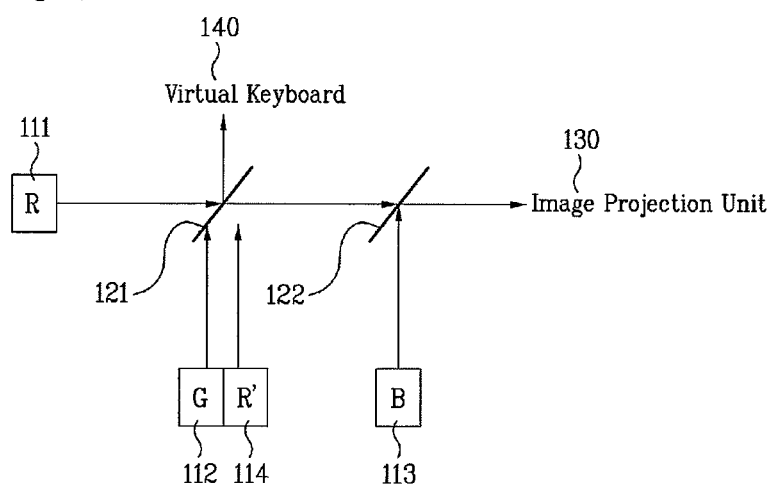
FIG. 4 is a schematic view illustrating an example of the configurations of a light source unit and a color synthesizing unit of a projection display device according to a second embodiment of the present invention, in which an additional light source is further included.

To this end, the projection display device may further include an additional light source 114 for supplying an additional amount of light to the virtual keyboard 140, in addition to the light sources 111, 112, and 113, as shown in FIG. 4.

FIG. 4 is a schematic view illustrating the configurations of a light source unit and a color synthesizing unit of a projection display device according to a second embodiment of the present invention, in which an additional light source is further included.

Referring to FIG. 4, as an example, the first dichroic mirror 121 is arranged at a position where the R light emitted from the R light source 111 and the G light emitted from the G light source 112 cross each other. An additional-R (R') light source 114 is additionally arranged at a position near the G light source 112, to supply an additional amount of light to the virtual keyboard 140.

Hereinafter, the R light source 111 of FIG. 2 will be referred to as a first R light source 111, and the R light source 114 for supplying an additional amount of red light to the virtual keyboard 140 will be referred to as a second R light source 114.

The first dichroic mirror 121 transmits the first R light (R) emitted from the first R light source 111 toward the image projection unit 130, while reflecting the G light emitted from the G light source 112 toward the image projection unit 130. At the same time, as discussed above, a portion of the first R light and the G light may be leaked through the first dichotic mirror 121 towards the virtual keyboard 140. Further, the first dichroic mirror 121 also transmits the second R light (R') emitted from the second R light source 114 toward the virtual keyboard 140 since the first dichroic mirror 121 may be configured to reflect a G light while transmitting all other wavelengths of lights including a R light.

In this case, the G light source 112 and the second R light source 114 may be combined in the form of a package. As the second R light source 114 is additionally provided, it is possible to supply an additional amount of light for the virtual keyboard 140. The second dichroic mirror 122 operates in the same or similar manner as the second dichroic mirror 122 of FIG. 2. For instance, the second dichroic mirror 122 transmits the R and G light from the first dichroic mirror 121 while reflecting a B light from the LED 113, so as to provide the combined R, G and B light to the image projection unit 130. To accomplish this, the second dichroic mirror 122 may be configured to reflect a B light while transmitting all other wavelengths of lights including R and G lights.

Figure 5:
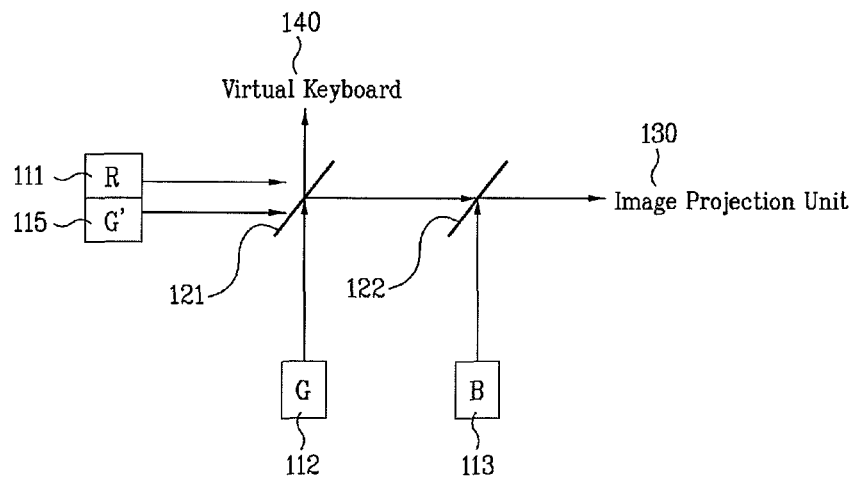
FIG. 5 is a schematic view illustrating an example of the configurations of a light source unit and a color synthesizing unit of a projection display device according to a third embodiment of the present invention, in which an additional light source is further included.

FIG. 5 is a schematic view illustrating the configurations of a light source unit and a color synthesizing unit of a projection display device according to a third embodiment of the present invention, in which an additional light source is further included.

Referring to FIG. 5, as an example, the first dichroic mirror 121 is arranged at a position where the R light emitted from the R light source 111 and the G light emitted from the G light source 112 cross each other. An additional-G (G') light source 115 is additionally arranged at a position near the R light source 111, to supply an additional amount of light to the virtual keyboard 140.

Hereinafter, the G light source 112 of FIG. 2 will be referred to as a first G light source 112, and the G light source 115 for supplying an additional amount of green light to the virtual keyboard 140 will be referred to as a second G light source 115.

The first dichroic mirror 121 transmits the R light emitted from the R light source 111 toward the image projection unit 130, while reflecting the first G light (G) emitted from the first G light source 112 toward the image projection unit 130. A portion of the R and/or G light from the R and G light sources 111 and 112 is intentionally leaked through the first dichroic mirror 121 to the virtual keyboard 140 as discussed above. In addition, the first dichroic mirror 121 also reflects the second G light (G') emitted from the second G light source 115 toward the virtual keyboard 140. This can be accomplished if the first dichroic mirror 121 is configured to reflect a G light while transmitting all other wavelengths of lights including a R light. In this case, the R light source 111 and the second G light source 115 may be combined in the form of a package. As the second G light source 115 is additionally provided, it is possible to supply an additional amount of light for the virtual keyboard 140. That is, in addition to the leaked portion of the R and G lights, the R light is provided to the virtual keyboard 140, which in turn uses the combined R, G and R light to generate and project a virtual keyboard image onto a surface area. The second dichroic mirror 122 here operates in the same manner as the second dichroic mirror 122 discussed in the previous embodiments.

Figure 6:
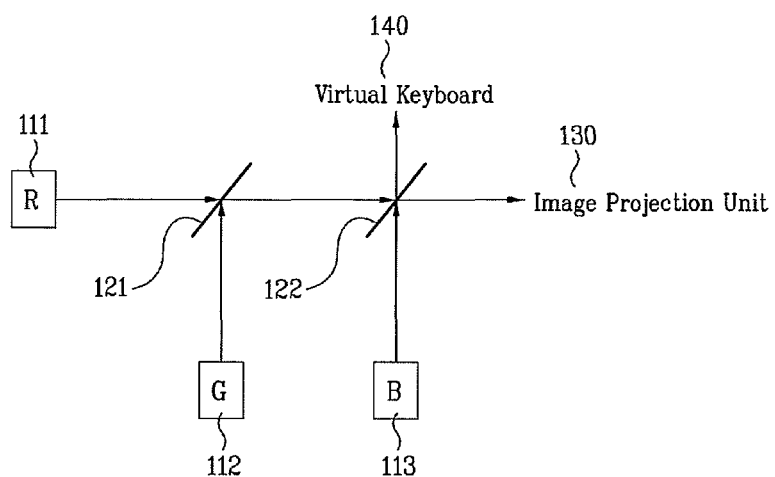
FIG. 6 is a schematic view illustrating an example of the configurations of a light source unit and a color synthesizing unit of a projection display device according to a fourth embodiment of the present invention, in which an additional light source is further included.

FIG. 6 is a schematic view illustrating the configurations of a light source unit and a color synthesizing unit of a project display device according to a fourth embodiment of the present invention, in which an additional light source is further included.

Referring to FIG. 6, as an example, the second dichroic mirror 121 is configured to intentionally leak an additional amount of light to be used in the virtual keyboard 140 for projecting a virtual keyboard image or the like in accordance with the fourth embodiment of the present invention. In this case, the virtual keyboard 140 is arranged on a light leakage path of the second dichroic mirror 122.

As shown in FIG. 6, the first dichroic mirror 121 transmits the R light from the light source 111 while reflecting the G light from the light source 112. the second dichroic mirror 122 transmits the R and G light emerging from the first dichroic mirror 121 while reflecting the B light from the light source 113, so that it emits the R, G, and B light to the image projection unit 130.

The second dichroic mirror 122 also sends a portion of the R and G light emerging from the first dichroic mirror 121 to the virtual keyboard 140 by reflecting the R and G light portion from the first dichroic mirror 121, and/or sends a portion of the B light emerging from the light source 113 to the virtual keyboard 140 by transmitting the B light portion.

That is, the second dichroic mirror 122 not only performs an original function of transmitting the R and G light while reflecting the B light, but also performs a function of reflecting a portion of the R and G light and/or transmitting a portion of the B light, such that the R and G light portion and/or the B light portion is directed to the virtual keyboard 140, in order to enable the R and G light sources 111 and 112 and/or the B light source 113 to be used as a light source for projection of a virtual keyboard image in the virtual keyboard 140 in accordance with the fourth embodiment of the present invention.

When an excessive amount of light is leaked from the second dichroic mirror 122 to the virtual keyboard 140, the picture quality of the image projected from the image projection unit 130 may be degraded. Therefore, it is preferred that the second dichroic mirror 122 be fabricated such that the leaked portion of light is within a range of 1 to 20%.

However, even when the second dichroic mirror 122 reflects a portion of the R and G light and/or transmits a portion of the B light within a range of 1 to 20%, it may be desirable to have more light or the amount of light supplied from the second dichroic mirror 122 may be insufficient, to enable the virtual keyboard 140 to project a virtual keyboard image.

Figure 7:
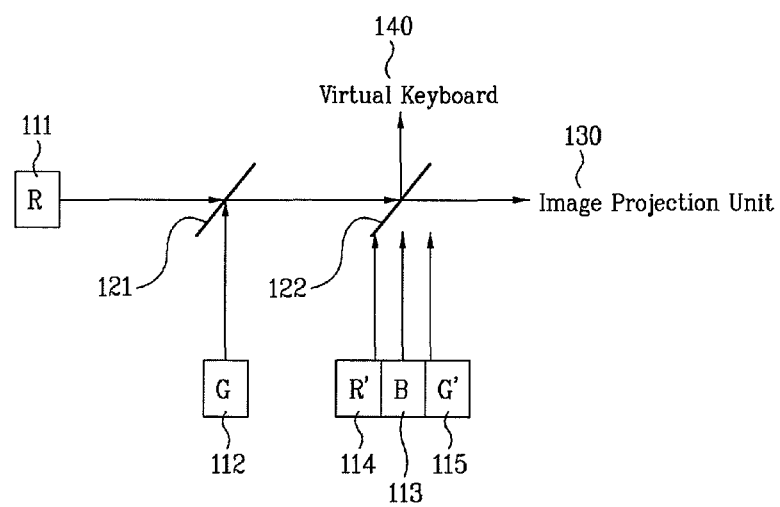
FIG. 7 is a schematic view illustrating an example of the configurations of a light source unit and a color synthesizing unit of a projection display device according to a fifth embodiment of the present invention, in which additional light sources are further included.

To this end, the projection display device may further include additional light sources 114 and 115 for supplying an additional amount of light to the virtual keyboard 140, in addition to the light sources 111, 112, and 113, as shown in FIG. 7.

FIG. 7 is a schematic view illustrating the configurations of a light source unit and a color synthesizing unit of a projection display device according to a fifth embodiment of the present invention, in which additional light sources are further included.

Referring to FIG. 7, as an example, the first dichroic mirror 121 transmits the R light from the R light source 111 while reflecting the G light from the G light source 112. The second dichroic mirror 122 is arranged at a position where the R light emitted from the R light source 111, the G light emitted from the G light source 112, and B light emitted from the B light source 113 cross each other. An additional-R (R') light source 114 and/or an additional-G (G') light source 115 are/is additionally arranged at a position near the B light source 113, to supply an additional amount of light to the virtual keyboard 140.

Hereinafter, the R light source 111 of FIG. 7 will be referred to as a first R light source 111, and the R light source 114 for supplying an additional amount of light to the virtual keyboard 140 will be referred to as a second R light source 114.

Also, the G light source 112 of FIG. 7 will be referred to as a first G light source 112, and the G light source 115 for supplying an additional amount of light to the virtual keyboard 140 will be referred to as a second G light source 115.

The second dichroic mirror 122 transmits therethrough the first R light (R) emitted from the first R light source 111 and the first G light (G) emitted from the first G light source 112 toward the image projection unit 130, while reflecting the B light emitted from the B light source 113 toward the image projection unit 130. As a result, the image projection unit 130 receives the combination of the R, G and B light from the second dichroic mirror 122, which is then used to project images on a screen. At this time, a portion of the R, G and B light may be intentionally leaked by the second dichroic mirror 122 to the virtual keyboard 140, which uses the leaked light to project a virtual keyboard image or the like.

In addition, the second dichroic mirror 122 also transmits the second R light (R') emitted from the second R light source 114 and the second G light (G') emitted from the second G light source 115 toward the virtual keyboard 140. In this case, the B light source 113, second R light source 114, and second G light source 115 may be combined in the form of a package. As the second R light source 114 and second G light source 115 are additionally provided, it is possible to supply an additional amount of light to the virtual keyboard 140.

Now, FIGS. 8-14, which illustrate various examples of different configurations for supplying a light to the virtual keyboard or the image projection unit of a projection display device, will be discussed according to the present invention. Any of the configurations of FIGS. 8-14 is equally applicable to a display device having any of the arrangements of the light sources and dichroic mirrors of the previous embodiments of the present invention. Further, these configurations may reduce the size or vary the shape of the projection display device in an effective manner.

Figure 8:
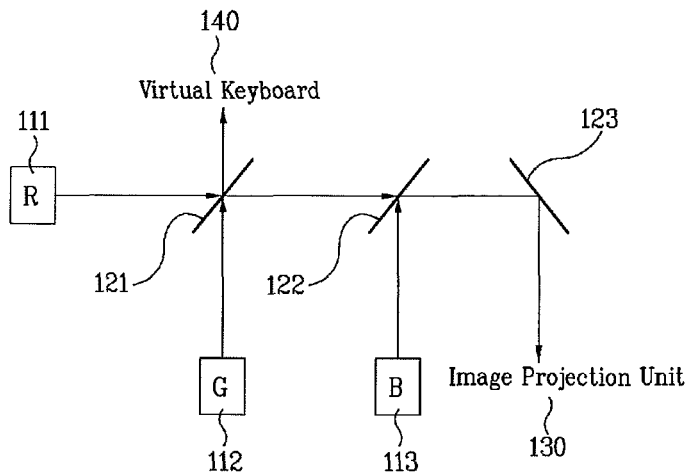
FIG. 8 is a schematic view illustrating an example of the configurations of a light source unit and a color synthesizing unit of a projection display device according to a sixth embodiment of the present invention.

FIG. 8 is a schematic view illustrating an arrangement between the second dichroic minor and the image projection unit according to a sixth embodiment of the present invention.

Referring to FIG. 8, the virtual keyboard 140 is arranged on one of the light leakage paths of the first and second dichroic mirrors 121 and 122. The image projection unit 130 is arranged in parallel to a keyboard image projection direction of the virtual keyboard 140. The image projection unit 130 projects an image in a direction reverse/opposite to the keyboard image projection direction of the virtual keyboard 140.

As shown in FIG. 8, a reflection mirror 123 may be arranged between the second dichroic mirror 122 and the image projection unit 130, to change an optical path such that the projection direction of the image projection unit 130 is parallel to the projection direction of the virtual keyboard 140. For instance, the light path of the light directed to the virtual keyboard 140 from the first dichroic minor 121 and the light path of the light directed to the image projection unit 130 (due to the reflection mirror 123) are parallel or substantially parallel to each other. As a result, the size of the projection display device may be reduced and/or the positioning of the virtual keyboard image may be more user-friendly with respect to the positioning of the image on the screen.

As the image from the image projection unit 130 and the keyboard image from the virtual keyboard 140 are reversely/oppositely projected under the condition in which the projection direction of the image projection unit 130 is parallel (or substantially parallel) to the projection direction of the virtual keyboard 140 using the reflection mirror 123, the user can more conveniently perform a key inputting operation, using the virtual keyboard 140 while viewing the image projected onto the screen.

Figure 9:
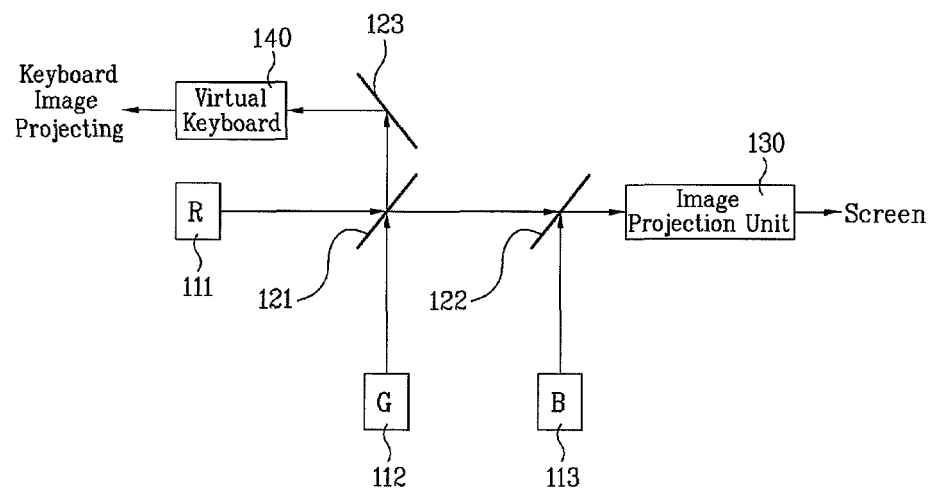
FIG. 9 is a schematic view illustrating an example of the configurations of a light source unit, a color synthesizing unit and a virtual keyboard of a projection display device according to a seventh embodiment of the present invention.
Figure 10:
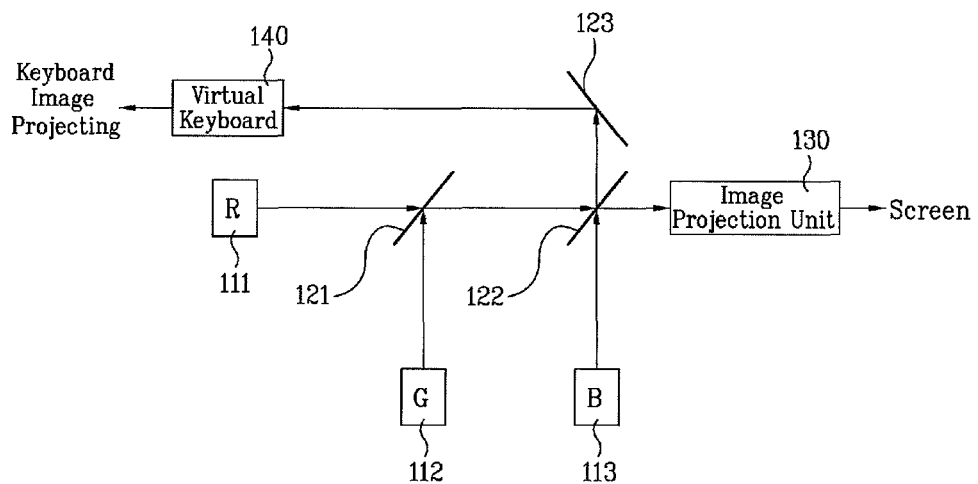
FIG. 10 is a schematic view illustrating an example of the configurations of a light source unit, a color synthesizing unit and a virtual keyboard of a projection display device according to an eighth embodiment of the present invention.

FIG. 9 is a schematic view illustrating an example of the configurations of a first dichroic mirror 121 and a virtual keyboard 140 of a projection display device according to a seventh embodiment of the present invention. FIG. 10 is a schematic view illustrating another example of the configurations of a first dichroic mirror 121 and a virtual keyboard 140 of a projection display device according to an eighth embodiment of the present invention.

Referring to FIG. 9, a reflection mirror 123 may be arranged between the first dichroic mirror 121 and the virtual keyboard 140. That is, the reflection mirror 123 is arranged on a light leakage path of the first dichroic mirror 121, to reflect the light intentionally leaked from the first dichroic mirror 121 such that the reflected light is sent to the virtual keyboard 140. As a result, the virtual keyboard 140 is arranged in parallel to the projection direction of the image projection unit 130. The virtual keyboard 140 then produces a keyboard image using the light sent from the reflection mirror 123. The produced virtual keyboard image is projected in a direction that is opposite yet parallel to the projection direction of the image from the image projection unit 130.

As the image from the image projection unit 130 and the keyboard image from the virtual keyboard 140 are projected in opposite directions under the condition in which the projection direction of the virtual keyboard 140 is parallel (or substantially parallel) to the projection direction of the image projection unit 130, using the reflection mirror 123, the user can more conveniently perform a key inputting operation using the virtual keyboard 140 while viewing the image projected onto the screen.

In still another example, the reflection mirror 123 may be arranged between the second dichroic mirror 122 and the virtual keyboard 140, as shown in FIG. 10. That is, the reflection mirror 123 is arranged on a light leakage path of the second dichroic mirror 122, to reflect the light leaked from the second dichroic mirror 122 such that the reflected leaked light is sent to the virtual keyboard 140. Here, the direction of the leaked light directed to the virtual keyboard 140 and the direction of the light directed to the image projection unit 130 are parallel and opposite to each other, whereby the keyboard image as well as the image projected on the screen may be projected in parallel, opposite directions.

Figure 11:
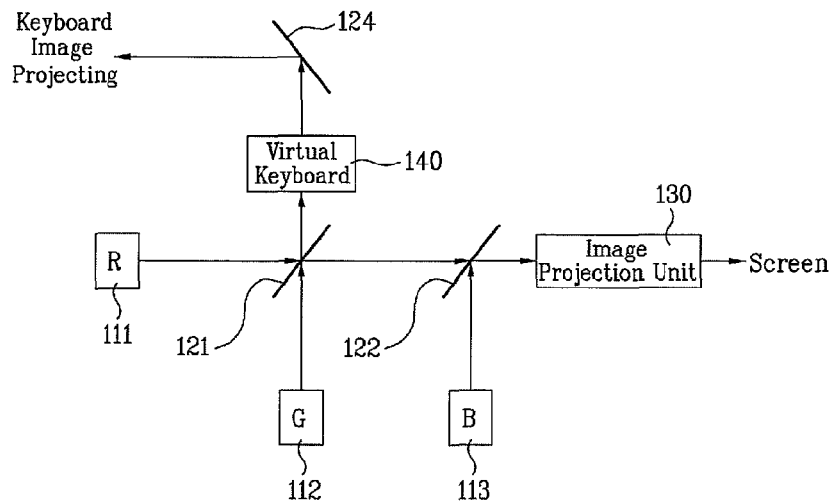
FIG. 11 is a schematic view illustrating an example of the configurations of a light source unit, a color synthesizing unit and a virtual keyboard of a projection display device for explaining a configuration arranged downstream from the virtual keyboard in the projection direction of the virtual keyboard in accordance with a ninth embodiment of the present invention.
Figure 12:
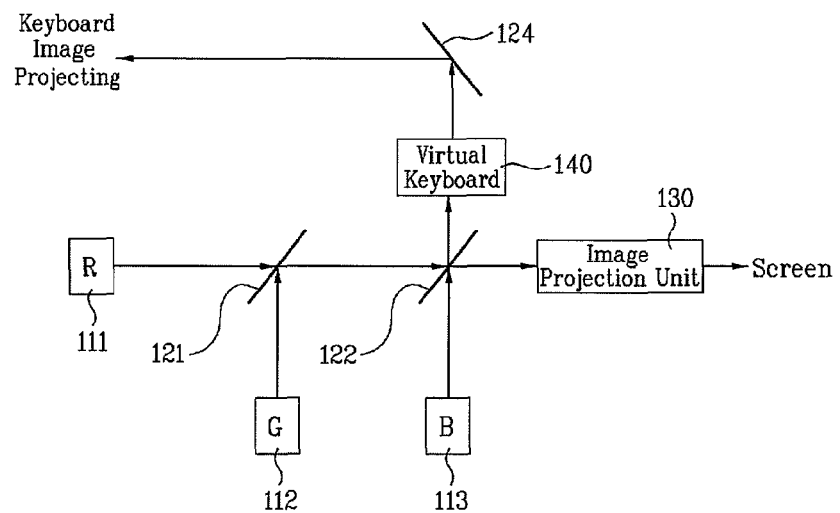
FIG. 12 is a schematic view illustrating an example of the configurations of a light source unit, a color synthesizing unit and a virtual keyboard of a projection display device for explaining a configuration arranged downstream from the virtual keyboard in the projection direction of the virtual keyboard in accordance with a tenth embodiment of the present invention.

In still other examples, as shown in FIGS. 11 and 12, a reflection mirror 124 may be arranged downstream from the virtual keyboard 140 in the projection direction of the virtual keyboard 140.

More specifically, FIG. 11 is a schematic view illustrating a configuration of a reflection mirror 124 arranged downstream from the virtual keyboard 140 in the projection direction of the virtual keyboard 140 in accordance with a ninth embodiment of the present invention. FIG. 12 is a schematic view illustrating a configuration of a reflection mirror 124 arranged downstream from the virtual keyboard 140 in the projection direction of the virtual keyboard 140 in accordance with a tenth embodiment of the present invention.

Referring to FIG. 11, the virtual keyboard 140 is arranged on the light leakage path of the first dichroic mirror 121. The reflection mirror 124 is arranged downstream from the virtual keyboard 140 in the keyboard image projection direction of the virtual keyboard 140. That is, the reflection mirror 124 reflects the keyboard image projected from the virtual key board 140, in parallel to the projection direction of the image projection unit 130 in a direction reverse/opposite to the image projection direction of the image projection unit 130.

As the image from the image projection unit 130 and the keyboard image from the virtual keyboard 140 are projected in opposite directions under the condition in which the virtual keyboard image projection direction of the virtual keyboard 140 is parallel to the image projection direction of the image projection unit 130 using the reflection mirror 124, the user can more conveniently perform a key inputting operation using the virtual keyboard 140 while viewing the image projected onto the screen.

Referring to FIG. 12, the virtual keyboard 140 may be arranged on the light leakage path of the second dichroic mirror 122. The reflection mirror 124 may be arranged downstream from the virtual keyboard 140 in the keyboard image projection direction of the virtual keyboard 140.

Figure 13:
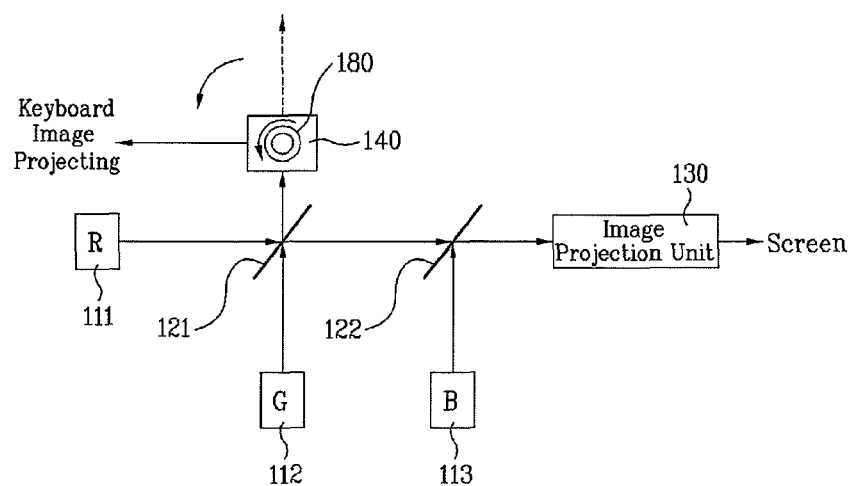
FIG. 13 is a schematic view illustrating an example of a rotating unit connected to a virtual keyboard of a projection display device in accordance with an eleventh embodiment of the present invention.
Figure 14:
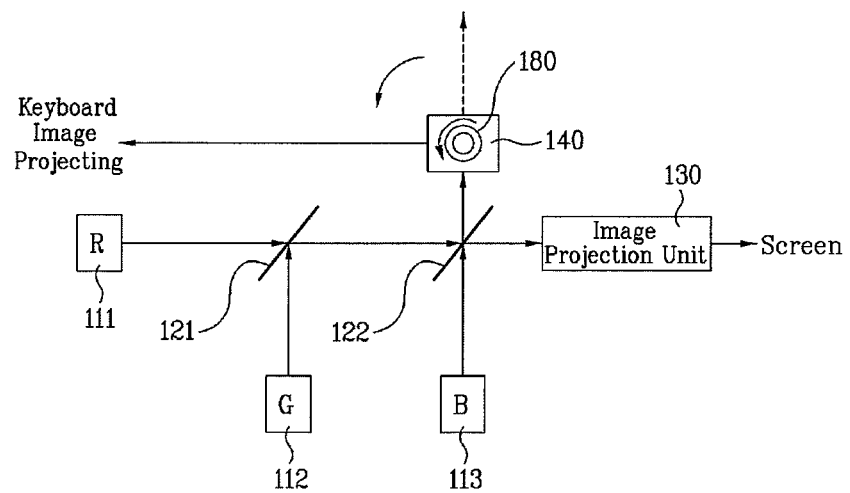
FIG. 14 is a schematic view illustrating an example of a rotating unit connected to a virtual keyboard of a projection display device in accordance with a twelfth embodiment of the present invention.

FIG. 13 is a schematic view illustrating a rotating unit connected to a virtual keyboard of a projection display device in accordance with an eleventh embodiment of the present invention. FIG. 14 is a schematic view illustrating a rotating unit connected to a virtual keyboard of a projection display device in accordance with a twelfth embodiment of the present invention. The rotating unit of FIGS. 13 and 14 is operatively connected to the virtual keyboard 140, and is part of the projection display device.

Referring to FIG. 13, as an example, the virtual keyboard 140 is arranged on the light leakage path of the first dichroic mirror 121, and may project a virtual keyboard image or the like (e.g., virtual button image, virtual mouse image, etc.) in a direction that is perpendicular to the image projection direction of the image projection unit 130. However, a rotating unit 180 is additionally provided at the center or any other designated area of the virtual keyboard 140, in order to rotate the virtual keyboard 140. The rotating unit 180 rotates the virtual key board 140 (or a part thereof) such that the projection direction of the virtual keyboard image (or other like) projected from the virtual keyboard 140 can be rotated. As a result, the projection direction of the virtual keyboard image can be changed to be parallel and opposite to the image projection direction of the image projection unit 130.

In this case, the rotating unit 180 can rotate the virtual keyboard 140 in a manual or automatic manner in accordance with an operation of the user or under the control of the controller 170. The rotating unit 180 may include a hinge, a knob, etc.

For instance, the user may manually operate the rotating unit 180 (e.g., by rotating a knob or dial), to rotate the virtual keyboard 140 such that the projection direction of the keyboard image (or the like) projected from the virtual keyboard 140 is parallel and opposite to the image projection direction of the image projection unit 130.

Alternatively, the controller 170 may control the rotating unit 180 to automatically and electronically rotate the virtual keyboard 140 when the projection direction of the keyboard image projected from the virtual keyboard 140 is not parallel and opposite to the image projection direction of the image projection unit 130. In this case, a rotating motor or other mechanism may be additionally provided in the rotating unit 180, to rotate the virtual keyboard 140 under the control of the controller 170.

In another example, referring to FIG. 14, the virtual keyboard 140 may be arranged on the light leakage path of the second dichroic mirror 122. The rotating unit 180 may be provided at the center of the virtual keyboard 140 arranged on the light leakage path of the second dichroic mirror 122. The rotating unit 180 of FIG. 14 can operate in the same manner as the rotating unit 180 of FIG. 13.

According to the present invention, the image projection unit 130 of the project display device 100 produces an image, using the light emerging from the color synthesizing unit 120, under the control of the controller 170, and then projects the produced image onto an external screen, to display the image. The image projection unit 130 may be classified into a display panel type or a scanner type. In fact, the image projection unit 130 in the various embodiments of the invention can be any type known in the art.

Hereinafter, an example of the configuration of the image projection unit 130, which is of a display panel type, will be described with reference to FIG. 15.

Figure 15:
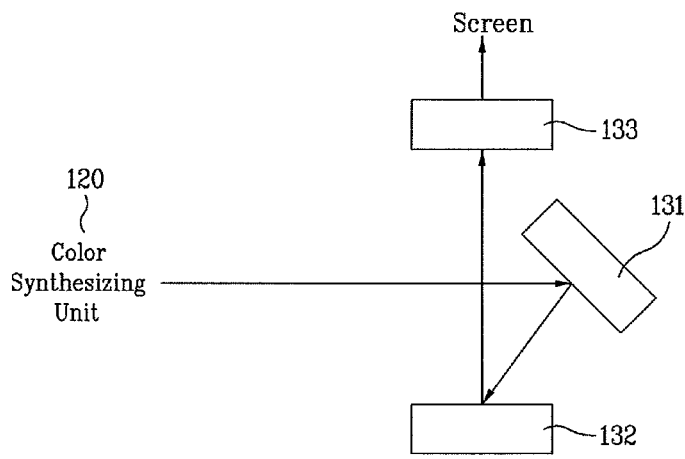
FIG. 15 is a schematic view illustrating an example of a display panel type image projection unit of a projection display device according to the present invention.

FIG. 15 is a schematic view illustrating a display panel type image projection unit of a projection display device according to an embodiment of the present invention.

Referring to FIG. 15, the display panel type image projection unit 130 according to the present invention includes a reflection plate 131 (e.g., mirror), a display panel 132, and a projection lens 133. All components of the display panel type image projection unit 130 are operatively coupled and configured.

The display panel 132 receives a light emerging from the color synthesizing unit 120 via the reflection plate 131, and projects an image onto the screen using the received light. The color synthesizing unit 120 here can be any color synthesizing unit 120 discussed above in the various embodiments. The display panel 132 may comprise a reflection type imaging unit such as a digital micro mirror device or a reflection type liquid crystal display device. The reflection type imaging unit selectively reflects incident light by pixels, to form an image. Meanwhile, the projection lens 133 projects the image produced by the display panel 132 onto the screen in an enlarged state.

Now, an example of the configuration of the image projection unit 130, which is of a scanner type, will be described with reference to FIGS. 16 to 18.

Figure 16:
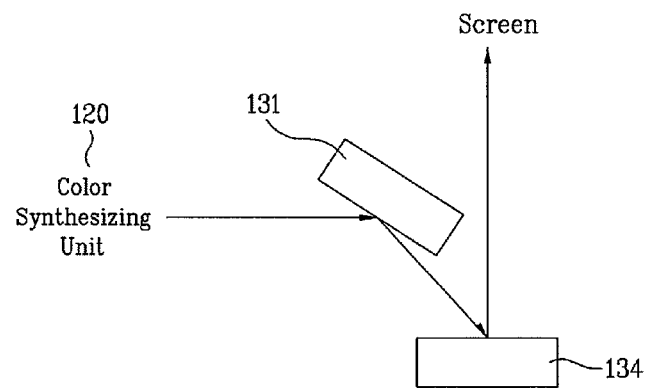
FIG. 16 is a schematic view illustrating an example of a scanner type image projection unit of a projection display device according to the present invention.

FIG. 16 is a schematic view illustrating a scanner type image projection unit according to an embodiment of the present invention.

Referring to FIG. 16, the scanner type image projection unit 130 according to the present invention includes a reflection plate 131 and a scanner 134. All components of the scanner type image projection unit 130 are operatively coupled and configured. The reflection plate 131 (e.g., minor) reflects the light received from the color synthesizing unit 120 towards the scanner 134. The color synthesizing unit 120 here can be any color synthesizing unit 120 discussed above in the various embodiments. The scanner 134 reflects the light received via the reflection plate 131 in a horizontal or vertical direction or in the horizontal and vertical directions (or in any designated manner), to raster-scan the reflected light onto the screen.

The scanner 134 can include at least one micro scanner having a rotatable minor. As an example of the micro scanner, a biaxially-driven micro scanner is shown in FIGS. 17 and 18.

Hereinafter, the micro scanner will be described in detail with reference to FIGS. 17 and 18. FIG. 17 is a perspective view illustrating an example of the micro scanner according to an embodiment of the present invention. FIG. 18 is a plan view for explaining connectors provided at the micro scanner of FIG. 17.

Figure 17:
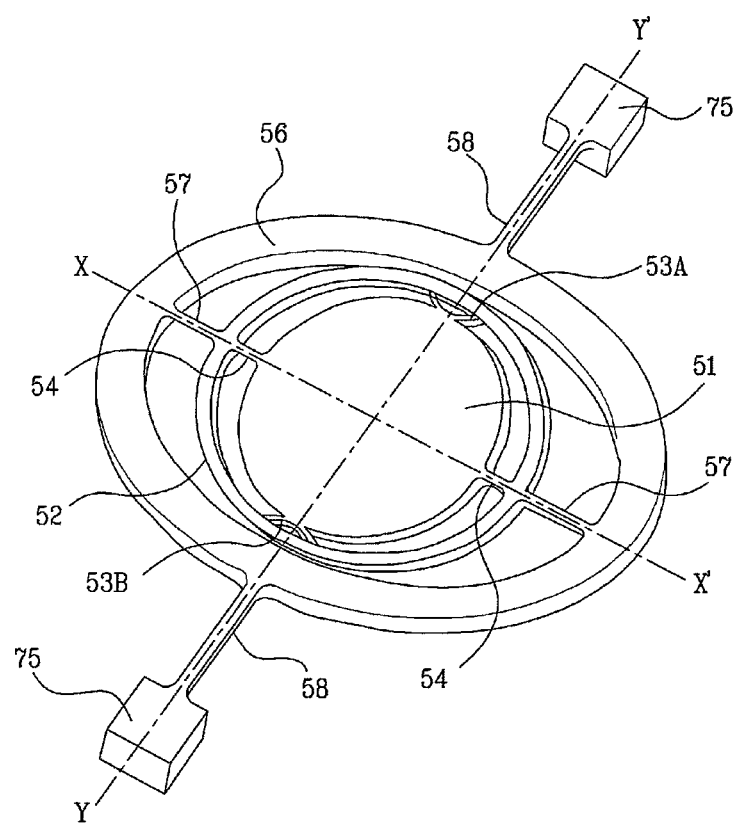
FIG. 17 is a perspective view illustrating an example of a micro scanner according to the present invention.
Figure 18:
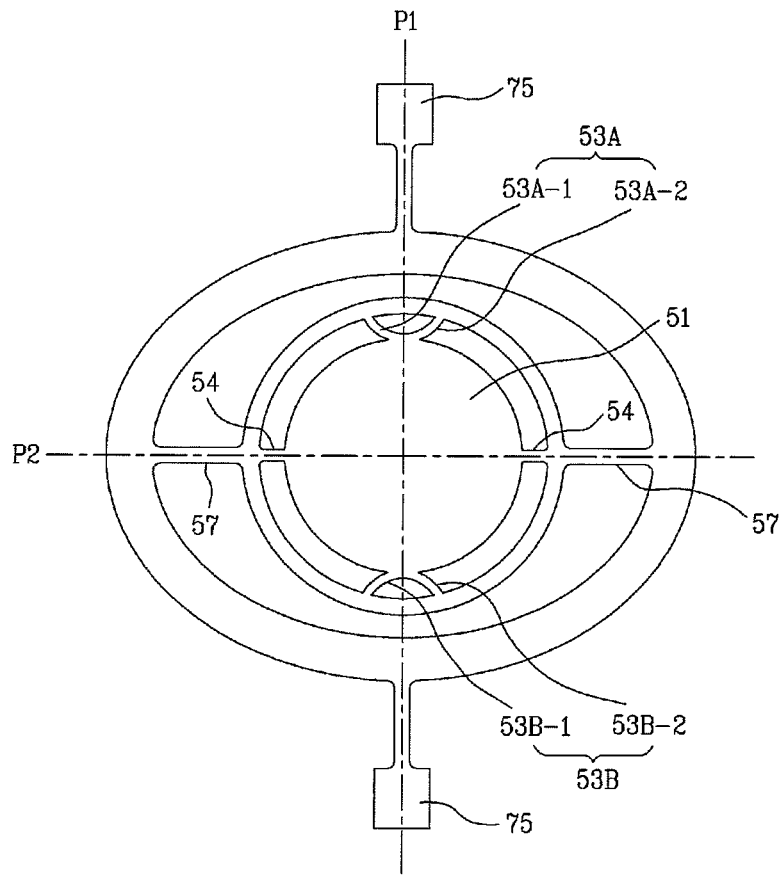
FIG. 18 is a plan view for explaining connectors provided at the micro scanner of FIG. 17.

As shown in FIGS. 17 and 18, the micro scanner, which can be used in the projection display device 100, includes a mirror plate 51 including a thin film formed with a reflection surface for reflecting laser light, and a frame arranged beneath the thin film to support the thin film, an outer frame 52 arranged to be outwardly spaced apart from the periphery of the minor plate 51, a plurality of connectors 53A, 53B, and 54 for connecting the mirror plate 51 and the outer frame 52, and a gimbal 56 arranged to be outwardly spaced apart from the periphery of the outer frame 52. The micro scanner also includes a pair of inner elastic flexible members 57 symmetrically formed with respect to the mirror plate 51, and connected to the gimbal 56 and to the outer frame 52, and a pair of outer elastic flexible structures 58 symmetrically formed with respect to the mirror plate 51, and connected to the gimbal 56 and to a pair of support members 75, to upwardly raise the mirror plate 51, outer frame 52, and gimbal 56.

As shown in FIGS. 17 and 18, the plural connectors 53A, 53B, and 54 functioning to connect the mirror plate 51 and the outer frame 52 include first connectors, namely, the connectors 54, and second connectors, namely, the connectors 53A and 53B. The second connectors 53A and 53B are formed on a first line P1 connecting the outer elastic flexible members 58 such that they are symmetrical with respect to the mirror plate 51. The first connectors 54 are formed on a second line P2 perpendicular to the first line P1 such that they are symmetrical with respect to the mirror plate 51. The second connector 53A includes two symmetrical portions 53A-1 and 53A-2, whereas the second connector 53B includes two symmetrical portions 53B-1 and 53B-2.

The gimbal 56 is connected to the outer frame 52 by the inner elastic flexible members 57. The gimbal 56 is also connected to the support members 75 by the outer elastic flexible members 58 symmetrically formed on a line perpendicular to the inner elastic flexible members 57.

The outer elastic flexible members 58 connect the gimbal 56 to the support members 75 such that the mirror plate 51, outer frame 52, and gimbal 56 are upwardly raised. In the drawings, only a portion of each support member 75 is schematically shown.

The inner and outer elastic flexible members 57 and 58 provide a recovering torque during operation of the micro mirror while functioning as rotating axes. That is, the outer frame 52 rotates about the inner elastic flexible members 57 as an axis (this axis extends a line X X' as shown in FIG. 17, and will be referred to as an "X-axis"). The gimbal 56 rotates about the outer elastic flexible members 58 as an axis (this axis extends a line Y-Y', as shown in FIG. 17, and will be referred to as a "Y-axis").

The micro scanner 134 having the above-described structure can perform rotating operations with 2 axial degrees of freedom. That is, the micro scanner 134 can rotate not only about the inner elastic flexible members 57, namely, the X-axis, but also about the outer elastic flexible members 58, namely, the Y-axis. The axial rotations of the micro scanner 134 do not have influence on each other, so that they can be independently controlled. Accordingly, it is possible to implement a micro mirror capable of being inclined from a 2-dimensional plane by an arbitrary angle.

When the above-described micro scanner 134 is used, the scanning operation is carried out in accordance with a micro rotation of the mirror plate 51. Accordingly, sweeping can be carried out at a very high speed.

Returning to FIG. 1, according to some embodiments the virtual keyboard 140 is arranged on an optical path of light leaked from the color synthesizing unit 120. The virtual keyboard 140 projects a keyboard image including at least one key image onto an external inactive surface (for example, a table surface, etc.), using the leaked light, to display the keyboard image. The virtual keyboard 140 may also project other input device images, e.g., mouse image, button image, joy stick image, etc. Thus, the virtual keyboard 140 may be referred to as a virtual input unit.

Before a more description of the virtual keyboard 140 is given, the input unit 150, memory 160, and controller 170 of the projection display device 100 will be described.

The input unit 150 can include a key pad, a dome switch, a touch pad (constant voltage/constant current), a jog wheel, a jog switch, etc. The input unit 150 generates input data, which will be used to control the operation of the projection display device 100 according to the present invention.

Where the projection display device 100 according to the present invention is internally or externally equipped, in the form of a pico projector, in a portable terminal such as a mobile phone, a smart phone, a notebook (laptop) computer, a digital broadcast terminal, an MP3 player, a PDA, a PMP, or a navigation terminal, or in a fixed terminal such as a digital TV, a desktop computer, a kiosk, etc., the input unit 150 may be an input unit equipped in the portable terminal or fixed terminal.

The memory 160 may store therein program(s) and data for controlling the projection display device 100 according to the present invention, and/or may perform a function of temporarily storing input/output data.

The memory 160 may include at least one storage medium selected from various storage mediums such as a flash memory type memory, a hard disk type memory, multimedia card micro type memory, a card type memory (for example, an SD or XD memory), a random access memory (RAM), a static random access memory (SRAM), a read-only memory (ROM), an electrically-erasable programmable read-only memory (EEPROM), a programmable read-only memory (PROM), a magnetic memory, a magnetic disc, and an optical disc.

The controller 170 controls the overall operation of the projection display device 100 according to the present invention. When a key signal for driving the projection display device 100 is input through the input unit 150 (or through the projected virtual keyboard), the controller 170 may control the light source unit 110, color synthesizing unit 120 and image projection unit 135, to project a virtual keyboard image and/or an image onto the screen.

When the keyboard image projection direction of the virtual keyboard 140 is not parallel and/or opposite to the image projection direction of the image projection unit 130, the controller 170 may also control the rotating unit 180 to rotate the virtual keyboard 140.

Where the projection display device 100 according to the present invention is internally or externally equipped, in the form of a pico projector, in a portable terminal such as a mobile phone, a smart phone, a notebook (laptop) computer, a digital broadcast terminal, a PDA, a PMP, an MP3 player, or a navigation terminal, or in a fixed terminal such as a digital TV, a desktop computer or a kiosk, the controller 170 may be a controller equipped in the portable terminal or fixed terminal.

In accordance with an embodiment of the present invention, a light shutter 181 and a condensing lens 182 may be additionally arranged between the color synthesizing unit 120 and the virtual keyboard 140 in the projection display device 100.

Figure 19:
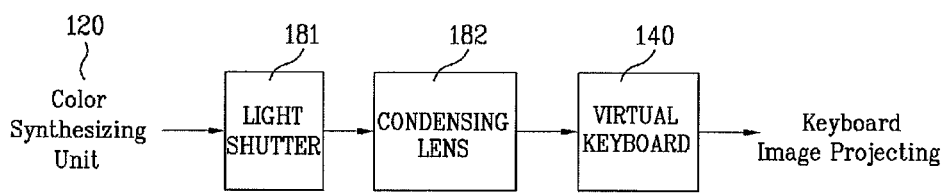
FIG. 19 is a schematic view illustrating a projection display device additionally including an optical shutter and a condensing lens in accordance with an embodiment of the present invention.

FIG. 19 is a schematic view illustrating a projection display device additionally including an optical shutter and a condensing lens in accordance with an embodiment of the present invention.

Referring to FIG. 19, a light shutter 181 is arranged between the color synthesizing unit 120 and the virtual keyboard 140, and can have a dynamic aperture (DA) driver structure or other known structure. The light shutter 181 then can dynamically adjust the amount of light leaked from the color synthesizing unit 120 under the control of the controller 170.

Hereinafter, the control operation of controller 170 for the light shutter 181 will be described.

When the projection display device 100 operates, the controller 170 controls the light shutter 181 such that the aperture of the light shutter 181 is always opened, in order to enable the virtual keyboard 140 to project a virtual keyboard image (or the like), simultaneously with the operation of the projection display device 100.

Alternatively, the controller 170 may control the light shutter 181 to be in closed state even when the projection display device 100 operates. In this case, when a key signal is input from the user through the input unit 150, to operate the virtual keyboard 140, the controller 170 may control the light shutter 181 such that the aperture of the light shutter 181 is opened in order to enable the virtual keyboard 140 to project a virtual keyboard image or the like.

In accordance with a key operation of the user to the input unit 150, the controller 170 may also adjust the aperture ratio of the light shutter 181, thereby adjusting the contrast of the virtual keyboard image projected from the virtual keyboard 140.

Meanwhile, the condensing lens 182 may comprise a collimating lens. The condensing lens 182 condenses the light emerging from the light shutter 181, and sends the condensed light to the virtual keyboard 140.

As apparent from the above description, in accordance with the present invention, it is possible to display a virtual keyboard image in a projection manner, only when the user desires the display of the virtual keyboard image, and to adjust the contrast of the virtual keyboard image, by additionally providing the light shutter 181 between the color synthesizing unit 120 and the virtual keyboard 140 in the configuration in which the virtual keyboard 140 projects the virtual keyboard image using the light intentionally leaked from the color synthesizing unit 120.

Hereinafter, different examples of the configuration of the virtual keyboard 140 according to the present invention will be described in detail with reference to FIGS. 20 and 21.

Figure 20:
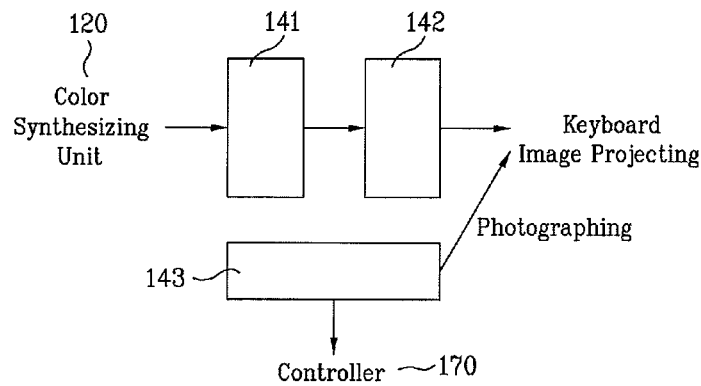
FIG. 20 is a schematic view illustrating an example of a virtual keyboard of a projection display device according to a thirteenth embodiment of the present invention.

FIG. 20 is a schematic view illustrating one example of a virtual keyboard of a projection display device according to a thirteenth embodiment of the present invention.

Referring to FIG. 20, as an example, the virtual keyboard 140 of the projection display device 100 according to the thirteenth embodiment of the present invention includes a mask 141, a projection lens 142, and a camera 143. All components of the virtual keyboard 140 are operatively coupled and configured.

The mask 141 has a pattern having a keyboard shape (or any other desired shape) including at least one key shape. The mask 141 produces a keyboard image, using the light leaked from the color synthesizing unit 120 as discussed above. For instance, when the light leaked from the color synthesizer 120 passes through the mask 141, a patterned keyboard image is produced by the mask 141.

The projection lens 142 projects the keyboard image produced by the mask 141 onto an external inactive surface (for example, a table surface, etc.).

The camera 143 photographs a finger angle and motion of the user on the keyboard image projected on the inactive surface, and outputs the photographed finger angle and motion.

In accordance with the finger angle and/or motion of the user photographed by the camera 143, the controller 170 recognizes a corresponding key input on the keyboard image, and performs an operation according to the recognized key input. The algorithms used to determine a specific input to the projection display device by analyzing the photographed finger angle and/or motion are known, which can be used herein.

In place of the mask 141, the virtual keyboard 140 may be implemented using a diffraction grating device.

Figure 21:
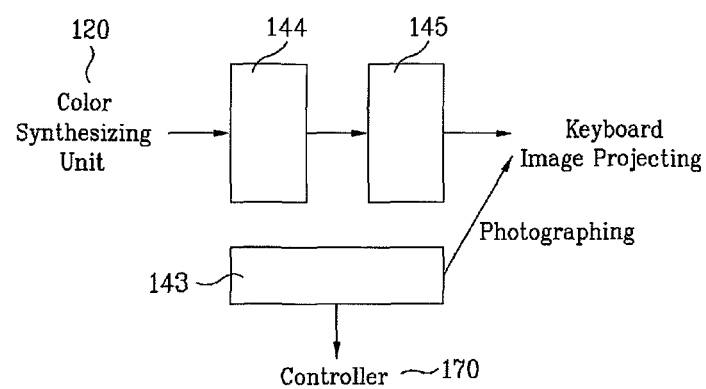
FIG. 21 is a schematic view illustrating an example of a virtual keyboard of a projection display device according to a fourteenth embodiment of the present invention.

FIG. 21 is a schematic view illustrating another example of a virtual keyboard of a projection display device according to a fourteenth embodiment of the present invention.

Referring to FIG. 21, as an example, the virtual keyboard 140 of the project display device 100 according to the fourteenth embodiment of the present invention includes a diffraction grating device 144, a lens 145, and a camera 143. All components of the virtual keyboard 140 are operatively coupled and configured.

The diffraction grating device 144 is fabricated to be recorded with phase data corresponding to a keyboard shape (or other desired shape) having at least one key shape or the like. The diffraction grating device 144 projects a keyboard image (or other input device image) using the light leaked from the color synthesizing unit 120 as discussed above.

The lens 145 functions to adjust the projection distance of the keyboard image projected from the diffraction grating device 144. The camera 143 captures the user's input to the virtual keyboard, which is then processed by the controller 170, as discussed above.

Accordingly, the present invention provides various examples of a projection display device, which uses a leakage light to project an input device image and which is user-friendly.

It will be apparent to those skilled in the art that various modifications and variations can be made in the present invention without departing from the spirit or scope of the invention.

Therefore, it should be noted that the above detailed description is intended only for illustrative purpose, without being limitatively interpreted. Thus, it is intended that the present invention cover the modifications and variations of this invention provided they come within the scope of the appended claims and their equivalents.

The invention claimed is:

1. A projection display device comprising:
a light source unit configured to emit lights;
a light dividing unit configured to divide a first projection light and a second projection light from the lights emitted by the light source unit;
an image projection unit configured to project an image using the first projection light from the light dividing unit; and
a virtual input unit configured to project an input unit image using the second projection light from the light dividing unit,
wherein the path direction of the first projection light is different from the path direction of the second projection light,
wherein the light dividing unit includes:
a first optical element arranged at a position where a first light and a second light from the light source unit cross each other; and
a second optical element arranged at a position where the first light and a third light from the light source unit cross each other,
wherein the first optical element and the second optical element are arranged in the path direction of the first projection light, and
wherein the path direction of the first projection light and the path direction of the second projection light are parallel to each other.

2. The projection display device according to claim 1, wherein the image from the image projection unit is projected in a direction opposite to a projection direction of the input unit image projected from the virtual input unit.

3. The projection display device according to claim 1, wherein a quantity of the first projection light is different from a quantity of the second projection light.

4. The projection display device according to claim 3, wherein the quantity of the first projection light is more than that of the second projection light.

5. The projection display device according to claim 1, wherein the first projection light combines at least two lights from the lights emitted by the light source unit, and
the second projection light is at least one light from the lights emitted by the light source unit.

6. The projection display device according to claim 5, wherein the first projection light combines at least two lights from red, green and blue lights, and
the second projection light is at least one light from red, green and blue lights.

7. The projection display device according to claim 1, wherein one of the first and second optical elements is configured to direct a portion of at least one of red, green and blue lights to the virtual input unit as the second projection light, while directing a portion of at least two of the red, green and blue lights to the image projection unit as part of the first projection light.

8. The projection display device according to claim 1,
wherein the first optical element is configured to transmit the first light while reflecting the second light, but also to reflect a portion of the first light or to transmit a portion of the second light such that the portion of the first or second light is sent toward the virtual input unit, and
wherein the second optical element is configured to transmit the first light and the second light while reflecting the third light.

9. The projection display device according to claim 8, wherein the first and second optical elements are a dichroic mirror.

10. The projection display device according to claim 1, wherein the first optical element is configured to transmit the first light while reflecting the second light, and
wherein the second optical element is configured to transmit the first and second light while reflecting the third light, thereby sending the first to third light toward the image projection unit, the second optical element being further configured to reflect a portion of the first and second light or to transmit a portion of the third light such that the portion of the first and second light or the portion of the third light is sent toward the virtual input unit.

11. The projection display device according to claim 1, further comprising a reflection member configured to reflect the first projection light from the light dividing unit and to send the reflected light to the image projection unit.

12. The projection display device according to claim 11, wherein the first projection light is reflected in a direction parallel to a projection direction of the second projection light from the light dividing unit.

13. The projection display device according to claim 1, further comprising a reflection member configured to reflect the second projection light from the light dividing unit and to send the reflected light to the virtual input unit.

14. The projection display device according to claim 13, wherein the second projection light is reflected in a direction parallel to a projection direction of the image from the image projection unit.

15. The projection display device according to claim 1, further comprising a reflection member configured to reflect the input unit image from the virtual input unit and to send the reflected input unit image to a surface.

16. The projection display device according to claim 15, wherein the input unit image is reflected in a direction parallel to a projection direction of the image from the image projection unit.

* * * * *